United States Patent [19]

Lehman et al.

[11] 4,281,950
[45] Aug. 4, 1981

[54] WHEELBARROW TRANSPORT DEVICE

[75] Inventors: Maurice E. Lehman, 1960 Horseshoes Rd., Lancaster, Pa. 17601; Roland P. Gehman, Stevens, Pa.

[73] Assignee: Maurice E., Lehman, Lancaster, Pa.

[21] Appl. No.: 27,723

[22] Filed: Apr. 6, 1979

[51] Int. Cl.² .............................................. B60P 1/24
[52] U.S. Cl. ........................................ 410/3; 414/537; 410/66; 280/47.31
[58] Field of Search ............... 414/426, 427, 428, 429, 414/430, 537, 462, 538, 469; 224/42.03 B; 280/402, 42.31; 410/2, 3, 156, 51, 66

[56] References Cited

U.S. PATENT DOCUMENTS

| 2,165,603 | 7/1939 | Yeats | 410/2 X |
| 2,980,270 | 4/1961 | Elliot et al. | 414/537 |
| 3,025,985 | 3/1962 | Crawford | 414/430 X |
| 3,720,333 | 3/1973 | Vaughn | 414/462 |
| 4,032,167 | 6/1977 | Chereda | 414/537 X |
| 4,052,079 | 10/1977 | Lehman | 280/47.32 X |
| 4,155,678 | 5/1976 | Lehman et al. | 280/402 X |

Primary Examiner—H. Grant Skaggs
Attorney, Agent, or Firm—B. P. Fishburne, Jr.

[57] ABSTRACT

A transport trailer for wheelbarrows includes a longitudinal channel member for the guidance and support of a wheelbarrow wheel and is adapted to be coupled to the drawbar of a garden tractor. A rear transverse member supports the rear end of the longitudinal channel at its center and includes on its upper side and on opposite sides of the longitudinal channel laterally adjustable locking bolts for the legs of wheelbarrows having diverse distances between legs. The rear transverse member carries at its ends a pair of wheels and a ramp for the wheelbarrow is pivotally attached to the rear of the trailer and is biased by a spring to extended and folded positions.

1 Claim, 3 Drawing Figures

WHEELBARROW TRANSPORT DEVICE

CROSS-REFERENCE TO RELATED APPLICATION

This application contains subject matter in common with prior copending application Ser. No. 880,940, filed Feb. 24, 1978, for WHEELBARROW TRANSPORT VEHICLE, now U.S. Pat. No. 4,155,678.

BACKGROUND OF THE INVENTION

Prior U.S. Pat. No. 4,052,079 discloses a wheelbarrow transport device in which the wheelbarrow legs are locked in raised positions within sockets at the rear end of a low profile dolly drawn by a garden tractor, the wheelbarrow wheel trailing the dolly and rolling on the ground during transport. Thus, the wheelbarrow is towed in a reverse mode.

In the above-referenced patent application, a garden tractor towed dolly includes an A-frame having spaced rear wheels and adjacent support and locking platforms for the legs of a wheelbarrow. A pivotal ramp on the dolly receives the wheelbarrow wheel and tilts automatically to a wheel-nesting position during transport of the wheelbarrow in a forward mode with the entire wheelbarrow supported on the dolly.

The present invention is an improvement and a simplification of both above-mentioned prior art devices. In the present invention, a single longitudinal channel member with upturned side flanges serves to guide and support the wheelbarrow front wheel and is directly coupled to the tractor drawbar. The rear end of the longitudinal channel member rests on a transverse channel member having downturned flanges and carrying ground wheels at its ends on short stub axles welded to the transverse channel member. A spring-biased flip-down flip-up wheelbarrow ramp is pivoted to the rear of the wheelbarrow transport trailer. Mounted on the transverse channel member between the ground wheels and the longitudinal channel member are a pair of simplified locking bolt units for the legs of wheelbarrows which rest on top of the transverse channel member immediately outwardly of the locking bolt means. Locking bolt units are bodily adjustable transversely to a number of locations on the transverse channel member to accommodate various transverse spacings of wheelbarrow legs. Strength of construction, simplicity and economy of manufacturing are features included in the invention.

DETAILED DESCRIPTION

Figure 1:
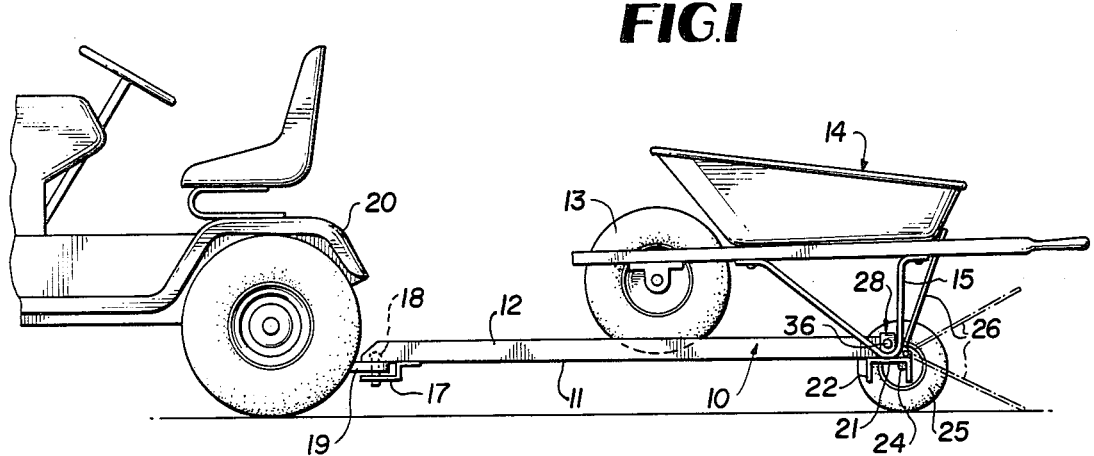
FIG. 1 is a side elevation of the invention showing the use thereof.

Referring to the drawings in detail wherein like numerals designate like parts, a simplified wheelbarrow transport dolly or trailer 10 comprises a longitudinal channel member 11 of suitable length having upturned parallel side flanges 12 thereon for the guidance and lateral support of a wheelbarrow wheel 13 during transport of a typical wheelbarrow 14 having conventional spaced rear legs 15, as shown in FIG. 1. At its forward end, the longitudinal channel member 10 is apertured through its bottom web at 16 and has a depressed apertured coupling element 17 to accept the coupling pin 18 in the transverse drawbar 19 at the rear of a conventional garden tractor 20.

The dolly 10 further comprises a rear transverse channel member 21 at right angles to the channel member 10 and extending equidistantly from opposite sides of the channel member 10 and having downturned flanges 22. The rear end portion of longitudinal channel member 10 rests solidly on the center of transverse channel member 21 and is bolted rigidly thereto as shown at 23 in the drawings. Short transverse stub axles 24 for the support of a pair of ground wheels 25 at the rear of the dolly are welded to the bottom of channel member 21 preferably at one corner thereof, as illustrated.

Figure 2:
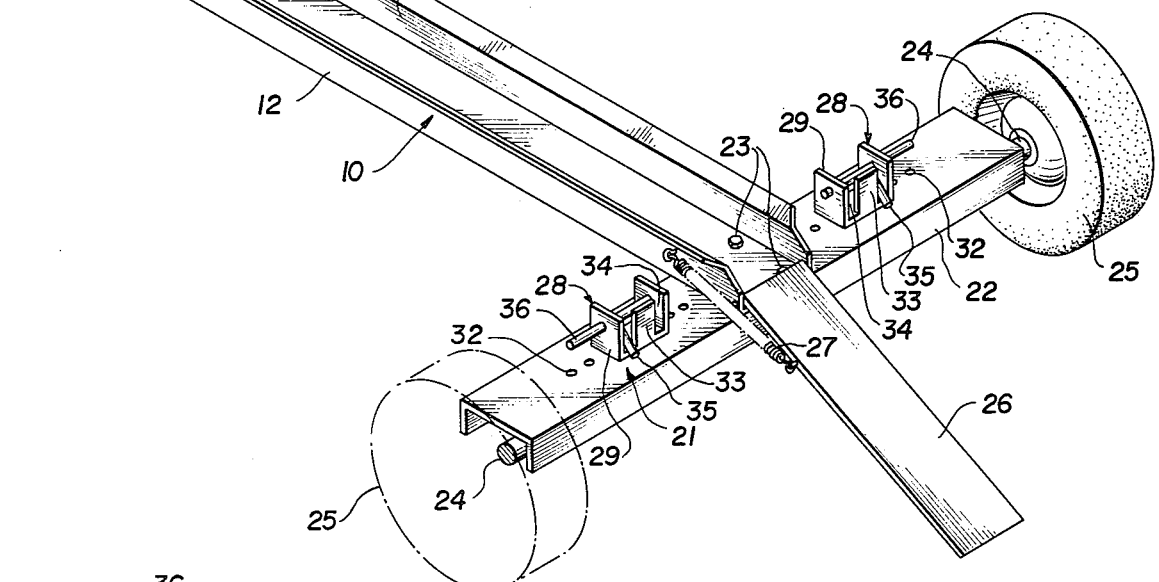
FIG. 2 is an enlarged perspective view of the invention.

An entrance and exit ramp plate 26 for the wheelbarrow wheel 13 is pivotally attached to the rear ends of channel sides 12 and is biased downwardly to the active position shown in FIG. 2 or upwardly to the transport position shown in FIG. 1 by a retractile spring 27 having a past dead center relationship to the pivot axis of the ramp plate 26, whereby the latter can be manually flipped to either of its two positions and will remain in such positions.

Mounted on the transverse channel member 21 on opposite sides of longitudinal channel member 10 are wheelbarrow leg locking bolt units 28 each having a U-shaped body 29 whose bottom wall 30 is apertured to receive bolting means 31. The top web of transverse channel member 21 adjacent to each unit 28 has a series of openings 32 formed therein in a transverse row adjacent to each unit 28, so that the locking bolt units may be bodily adjusted transversely on the dolly to several different use positions, whereby they can accept the legs 15 of several different lateral spacings on different sizes and types of wheelbarrows. The bolts 31 securely lock the units 28 in their selected adjusted positions on the channel 21.

Each unit 28 includes a rear upstanding plate section 33 defining a pair of top opening slots 34 on opposite sides thereof to receive the adjusting handle extension 35 of a transverse locking bolt 36 for each wheelbarrow leg 15. As shown in FIG. 1, when the wheelbarrow 14 is in transport with its wheel 13 seated on the channel member 10, its two rear legs 15 rest on the upper surface of channel member 21 outwardly of the units 28 and between them and the wheels 25. The locking bolts 36, which are shown adjusted to their outwardly extended leg locking positions in FIG. 2, project across the bight at the bottom of each leg 15 and hold the leg captive against vertical displacement upwardly. The outer sides of the U-shaped bodies 29 of units 28 prevent any significant lateral displacement of the wheelbarrow legs on the underlying support channel member 21. Therefore, the bolts 36, when in their projecting positions of FIG. 2, effectively lock the two wheelbarrow legs 15 in place on the dolly 10 so that the wheelbarrow cannot shift relative to the dolly in transport.

Figure 3:
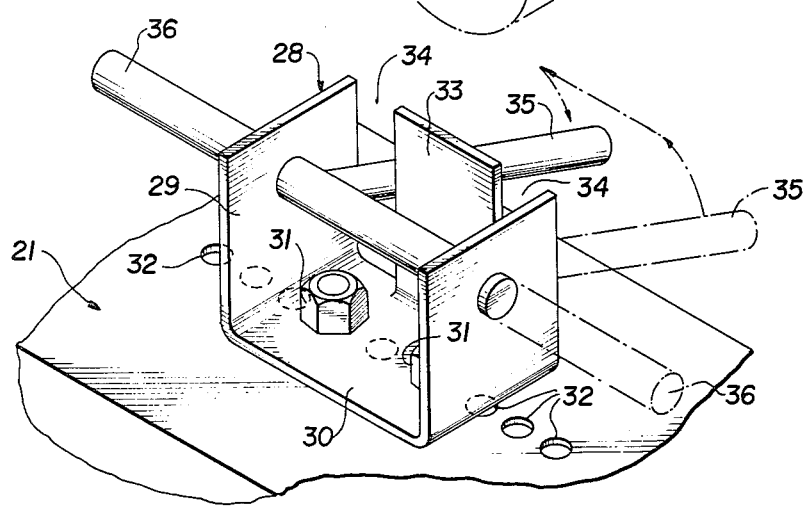
FIG. 3 is a further enlarged fragmentary perspective view showing one adjustable locking bolt unit.

FIG. 3 shows one of the bolts 36 in the retracted non-locking position in full lines and in the extended active locking position corresponding to FIG. 2 in phantom line. To shift each bolt 36 between these two positions, it is merely required to raise the handle extension 35 upwardly through the open top of one slot 34 and shift it across the top edge of plate section 33 and allow it to drop into the other locking slot 34. Gravity will maintain the handle extensions 35 within the selected slot 34 of each locking unit. As previously described, the units 28 are laterally adjustable and lockable on the channel member 21 to several different spacings, whereby the dolly can accommodate various sizes of wheelbarrows and wheelbarrow leg spacings. The longitudinal channel member 10 is long enough to accommodate wheelbarrows of all lengths.

As shown in FIG. 1, the dolly 10 has low ground clearance for stability. The many advantages of the device over the prior art should be apparant in view of the foregoing description.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. A wheelbarrow transport vehicle comprising a longitudinal upwardly open channel member adapted to receive guidingly and support a wheelbarrow wheel and adapted to have its forward end coupled to a towing vehicle, a transverse downwardly open channel member rigidly coupled in back-to-back relationship to the longitudinal channel member near the rear end of the latter and extending equidistantly on opposite sides thereof, a pair of support wheels for the vehicle journaled on the opposite ends of the transverse channel member, a ramp plate for a wheelbarrow wheel hingedly secured to the longitudinal channel member at the rear thereof and having substantially the same width as the longitudinal channel member, past dead center biasing spring means for the ramp plate connected between the ramp plate and the longitudinal channel member, and a pair of wheelbarrow leg locking units on the transverse channel member on opposite sides of the longitudinal channel member, the transverse channel member having adjusting apertures for said units on opposite sides of the longitudinal channel member, attaching means for said units engageable within selected adjusting apertures, each locking unit including a body portion having spaced upstanding side walls and a rear partial wall defining with said side walls a pair of bolt handle receptor slots, and each unit including a transverse axis locking bolt having an adjusting handle engageable selectively in either of said receptor slots, said bolts when in active locking positions projecting laterally outwardly of said body portions and locking the legs of a wheelbarrow to the transverse channel member, such channel member having wheelbarrow leg support surfaces outwardly of said locking units and between the units and said support wheels.

* * * * *